(12) United States Patent
Higa et al.

(10) Patent No.: US 9,233,681 B2
(45) Date of Patent: Jan. 12, 2016

(54) CONTROL DEVICE FOR VEHICLE

(75) Inventors: Mitsuaki Higa, Toyota (JP); Eiji Fukushiro, Tokai (JP); Katsuhiko Yamaguchi, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/123,558

(22) PCT Filed: Jun. 14, 2011

(86) PCT No.: PCT/JP2011/063571
§ 371 (c)(1),
(2), (4) Date: Dec. 3, 2013

(87) PCT Pub. No.: WO2012/172639
PCT Pub. Date: Dec. 20, 2012

(65) Prior Publication Data
US 2014/0129068 A1 May 8, 2014

(51) Int. Cl.
*B60W 10/08* (2006.01)
*B60W 30/18* (2012.01)
*B60W 20/00* (2006.01)
*B60K 6/445* (2007.10)
*B60W 10/06* (2006.01)
*B60W 10/02* (2006.01)

(52) U.S. Cl.
CPC ............... *B60W 20/00* (2013.01); *B60K 6/445* (2013.01); *B60W 10/026* (2013.01); *B60W 10/06* (2013.01); *B60W 10/08* (2013.01); *B60W 30/18063* (2013.01); *B60W 20/10* (2013.01); *B60W 2520/06* (2013.01); *B60W 2520/10* (2013.01); *B60W 2540/10* (2013.01); *B60W 2540/12* (2013.01); *B60W 2710/024* (2013.01); *B60W 2710/0644* (2013.01); *B60W 2710/083* (2013.01); *Y02T 10/6239* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 5,863,277 | A * | 1/1999 | Melbourne | 477/203 |
| 2004/0077444 | A1* | 4/2004 | Kanda et al. | 474/8 |
| 2004/0113489 | A1* | 6/2004 | Iwagawa et al. | 303/155 |
| 2004/0180753 | A1* | 9/2004 | Takamura et al. | 477/94 |
| 2005/0187671 | A1* | 8/2005 | Nada | 701/1 |
| 2006/0040789 | A1* | 2/2006 | Katou et al. | 477/97 |
| 2009/0305847 | A1* | 12/2009 | Klump et al. | 477/86 |
| 2011/0046829 | A1* | 2/2011 | Tamai et al. | 701/22 |
| 2013/0090800 | A1* | 4/2013 | Nakamura et al. | 701/22 |
| 2013/0288855 | A1* | 10/2013 | Monsere | 477/24 |

FOREIGN PATENT DOCUMENTS

| | | |
|---|---|---|
| CN | 101992768 A | 3/2011 |
| JP | 10-191507 A | 7/1998 |
| JP | 1169508 A | 3/1999 |

(Continued)

*Primary Examiner* — Rami Khatib
*Assistant Examiner* — Jeffrey Boomer
(74) *Attorney, Agent, or Firm* — Sughrue Mion, PLLC

(57) ABSTRACT

A hybrid vehicle outputs creep torque by output torque of a second MG. A creep control unit controls creep torque when an accelerator pedal is not operated. The creep control unit controls a creep cut amount defined by a decrement of creep torque when the brake pedal is operated relative to creep torque when the brake pedal is not operated such that the creep cut amount when reverse running is selected is smaller than the creep cut amount when forward running is selected.

8 Claims, 8 Drawing Sheets

(56) References Cited

FOREIGN PATENT DOCUMENTS

| JP | 11-299006 A | 10/1999 | | | |
|---|---|---|---|---|---|
| JP | 2002-142310 A | 5/2002 | | | |
| JP | 2004316747 A | 11/2004 | | | |
| JP | 2008-100580 A | 5/2008 | | | |
| JP | 2008-221935 A | 9/2008 | | | |
| JP | 2009-011057 A | 1/2009 | | | |
| JP | 2009-262766 A | 11/2009 | | | |
| JP | 2010004705 A | 1/2010 | | | |
| JP | EP 2641774 A1 | * | 9/2013 | ............ | B60L 11/123 |

* cited by examiner

CONTROL DEVICE FOR VEHICLE

CROSS REFERENCE TO RELATED APPLICATIONS

This application is a National Stage of International Application No. PCT/JP2011/063571 filed Jun. 14, 2011, the contents of all of which are incorporated herein by reference in their entirety.

TECHNICAL FIELD

The present invention relates to a control device for a vehicle, and more particularly relates to control of creep torque when a brake is operated.

BACKGROUND ART

In a vehicle with a torque converter mounted thereon, a so-called creep phenomenon occurs in which the vehicle starts to move by the occurrence of minute vehicle driving force when an accelerator pedal is not operated (when an accelerator is off). Japanese Patent Laying-Open No. 2002-142310 (PTD 1), Japanese Patent Laying-Open No. 10-191507 (PTD 2), and the like describe, as for an electric powered vehicle using a motor as the source of driving force, such as an electric vehicle and a hybrid vehicle, control of producing vehicle driving force for creep running (hereinafter also referred to as creep torque) when the accelerator is off.

Japanese Patent Laying-Open No. 2002-142310 (PTD 1) describes correction for reducing creep torque in accordance with torque on the braking side calculated from braking force so as to produce suitable creep torque in accordance with a brake operation. Japanese Patent Laying-Open No. 10-191507 (PTD 2) describes performing brake assist at the instant when a mode of starting with an electric motor serving as the source of motive power and a mode of starting with an engine serving as the source of motive power are switched at the time of creep control.

Japanese Patent Laying-Open No. 2008-221935 (PTD 3) describes control of gradually decreasing creep torque output from a motor to zero and causing breaking force based on requested torque to function on a driving wheel if requested torque is negative torque and the vehicular state is in a creep torque output range when constant speed running is instructed.

Japanese Patent Laying-Open No. 2008-100580 (PTD 4) describes setting vehicle driving force for smooth starting when an accelerator is turned on in the state where braking torque is output and the vehicle is at a stop. Specifically, it is described that control is exerted to bring braking torque obtained by a brake unit gradually closer to zero and to increase driving torque by an increment based on a decrement of braking torque.

Japanese Patent Laying-Open No. 2009-262766 (PTD 5) describes control of achieving a vehicle stop by an automatic brake as a backward movement prevention device at the time of a vehicle stop even when a driver tries to stop the vehicle on an uphill road.

CITATION LIST

Patent Document

PTD 1: Japanese Patent Laying-Open No. 2002-142310
PTD 2: Japanese Patent Laying-Open No. 10-191507
PTD 3: Japanese Patent Laying-Open No. 2008-221935
PTD 4: Japanese Patent Laying-Open No. 2008-100580
PTD 5: Japanese Patent Laying-Open No. 2009-262766

SUMMARY OF INVENTION

Technical Problem

In PTD 1, fuel efficiency can be improved by control of decreasing creep torque (so-called creep cut) when the brake pedal is operated.

However, creep running is performed not only during forward running but also during reverse running. Since creep running during reverse running is often used in the case of moving the vehicle into a parking area, a more delicate brake work is required than in forward running.

Therefore, if the creep cut as described in PTD 1 is simply applied, creep torque sensitively varies in accordance with the brake operated amount in creep running during reverse running, which may give a user an uncomfortable feeling.

The present invention was made to solve such a problem, and an object of the present invention is to improve driving operability during reverse running by creep torque in addition to improvement in fuel efficiency achieved by creep cut.

Solution to Problem

In an aspect of the present invention, a control device for a vehicle on which a powertrain for producing vehicle driving force for a wheel and a braking mechanism for producing vehicle breaking force in accordance with an operation of a brake pedal are mounted includes a sensing unit and a control unit. The sensing unit is configured to sense an input for selecting between forward running and reverse running. The control unit controls creep torque produced by the powertrain when an accelerator pedal is not operated. In particular, the control unit is configured such that, as for a degree of reduction in the creep torque when the brake pedal is operated relative to the creep torque when the brake pedal is not operated, the degree of reduction when the reverse running is selected is smaller than the degree of reduction when the forward running is selected.

Preferably, the powertrain includes an electric motor configured to have a motive power transmission path leading to the wheel. The control device further includes an electric motor control unit configured to control output torque of the electric motor so as to produce the creep torque set by the control unit.

More preferably, the control unit sets the degree of reduction when the brake pedal is operated based on an operated amount of the brake pedal and a vehicular speed.

Still more preferably, the control unit sets the degree of reduction when the brake pedal is operated such that the degree of change in the creep torque relative to change in an operated amount of the brake pedal is smaller when the reverse running is selected than when the forward running is selected.

Alternatively preferably, the powertrain has an internal combustion engine and a torque converter. The control unit controls an idle speed of the internal combustion engine, thereby varying the creep torque.

More preferably, the control unit, as for the degree of reduction in the idle speed when the brake pedal is operated relative to the idle speed when the brake pedal is not operated, controls the idle speed such that the degree of reduction when the reverse running is selected is smaller than the degree of reduction when the forward running is selected.

Preferably, the powertrain has an internal combustion engine, a torque converter and a transmission. When an operated amount of the brake pedal is larger than a threshold value when the accelerator pedal is not operated and when a vehicular speed is lower than a predetermined speed, the control unit is configured to execute control of releasing a predetermined friction element of a plurality of friction elements included in the torque converter, thereby reducing torque input from the internal combustion engine to the transmission. When the reverse running is selected, the threshold value is set at a value larger than when the forward running is selected.

In another aspect of the present invention, a control method for a vehicle on which a powertrain for producing vehicle driving force for a wheel and a braking mechanism for producing vehicle breaking force in accordance with an operation of a brake pedal are mounted includes the step of controlling creep torque produced by the powertrain when an accelerator pedal is not operated. The step of controlling includes the steps of determining which of forward running and reverse running has been selected, and controlling the creep torque such that, as for a degree of reduction in the creep torque when the brake pedal is operated relative to the creep torque when the brake pedal is not operated, the degree of reduction when the reverse running is selected is smaller than the degree of reduction when the forward running is selected.

Advantageous Effects of Invention

According to the present invention, driving operability during reverse running by creep torque can be improved in addition to improvement in fuel efficiency achieved by creep cut.

DESCRIPTION OF EMBODIMENTS

Figure 1:
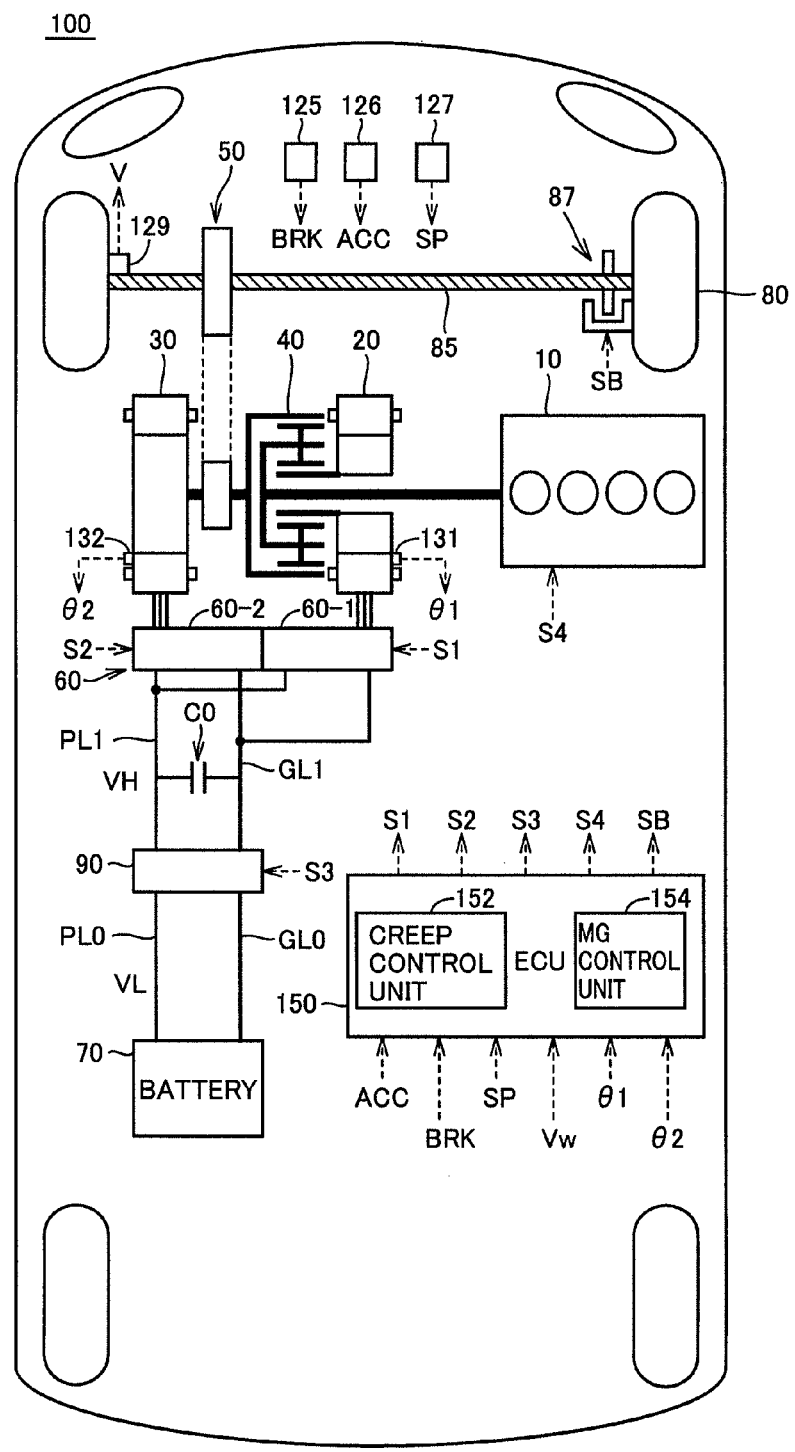
FIG. 1 is a block diagram showing an exemplary configuration of a powertrain of a hybrid vehicle shown as a representative example of a vehicle to which a control device for a vehicle according to a first embodiment of the present invention is applied.

Hereinafter, embodiments of the present invention will be described in detail with reference to the drawings. It is noted that the same or corresponding portions in the drawings have the same reference characters allotted, and description thereof will not be repeated basically.

First Embodiment

FIG. 1 is a block diagram showing an exemplary configuration of a powertrain of an electric powered vehicle shown as a representative example of a vehicle to which a control device for a vehicle according to a first embodiment of the present invention is applied. A hybrid vehicle is shown in FIG. 1 as an example of electric powered vehicle.

Herein, the electric powered vehicle is a representative of vehicles equipped with a traction motor for producing vehicle driving force. That is, it is described for confirmation that the electric powered vehicle includes an electric vehicle and a fuel cell vehicle not equipped with an engine, and the like, besides a hybrid vehicle that produces vehicle driving force by the engine and the motor.

Referring to FIG. 1, a hybrid vehicle 100 includes an engine 10, a first MG (Motor Generator) 20, a second MG 30, a power split device 40, a reduction gear 50, a driving wheel 80, a driving shaft 85, and a braking mechanism 87. Hybrid vehicle 100 also includes an inverter 60, a battery 70, a smoothing capacitor C0, a converter 90, and an electronic control unit (hereinafter called "ECU") 150.

Engine 10 is a well-known internal combustion engine that produces driving force for rotating a crankshaft by combustion energy produced when an air-fuel mixture of air and fuel taken into a combustion chamber is burnt, and is configured to be capable of electrically controlling the operating state including the throttle opening angle (suction amount), fuel supply, ignition timing, and the like. Engine 10 is controlled based on a control signal S4 from ECU 150.

First MG 20 and second MG 30 are AC motors, and are three-phase AC synchronous motors, for example.

Hybrid vehicle 100 runs with driving force output from at least one of engine 10 and second MG 30. The driving force produced by engine 10 is split into two paths by power split device 40. More specifically, one is a path leading to driving shaft 85 and driving wheel 80 via reduction gear 50, and the other one is a path leading to first MG 20.

Power split device 40 is composed of a planetary gear including a sun gear, a pinion gear, a carrier, and a ring gear. The pinion gear is engaged with the sun gear and the ring gear. The carrier supports the pinion gear rotatably, and is coupled to the crankshaft of engine 10. The sun gear is coupled to the rotation shaft of first MG 20. The ring gear is coupled to the rotation shaft of second MG 30 and reduction gear 50.

First MG 20 operates as a power generator using motive power of engine 10 transmitted via power split device 40. Electric power generated by first MG 20 is supplied to second MG 20 via inverter 60, and is used as electric power for driving second MG 20. Of the electric power generated by first MG 20, excess power which is not used as electric power for driving second MG 20 is supplied to battery 70 via converter 90, and is used as electric power for charging battery 70. The amount of power generated by first MG 20 is controlled depending on SOC (State of Charge) of battery 70.

Second MG 30 produces driving force using at least one of electric power stored in battery 70 and electric power generated by first MG 20. Then, the driving force of second MG 30 is transmitted to driving shaft 85 and driving wheel 80 via reduction gear 50. It is noted that although FIG. 1 shows driving wheel 80 as a front wheel, a rear wheel may be driven by second MG 30 instead of or together with the front wheel. In this manner, in FIG. 1, a powertrain for producing vehicle driving force for driving wheel 80 is configured to include second MG 30 configured to have a motive power transmission path leading to driving wheel 80.

It is noted that, at the time of braking of hybrid vehicle 100, second MG 30 is driven by driving wheel 80 via reduction gear 50 and driving shaft 85, and second MG 30 operates as a power generator. Accordingly, second MG 30 also serves as a regeneration brake that converts vehicular kinetic energy into electric power. Electric power generated by second MG 30 is stored in battery 70.

Braking mechanism 87 is configured to produce vehicle breaking force corresponding to a control signal SB from ECU 150. For example, vehicle breaking force (fluid pressure breaking force) is produced by pressing a foil cylinder not shown against a disc-shaped brake disc (not shown) by a fluid pressure produced in accordance with control signal SB.

Inverter 60 includes a first inverter 60-1 and a second inverter 60-2. First inverter 60-1 and second inverter 60-2 are connected to converter 90 in parallel to each other.

First inverter 60-1 is provided between converter 90 and first MG 20. First inverter 60-1 controls the output of first MG 20 based on a control signal S1 from ECU 150. Second inverter 60-2 is provided between converter 90 and second MG 30. Second inverter 60-2 controls the output of second MG 30 based on a control signal S2 from ECU 150.

For controlling first MG 20 and second MG 30, PWM (Pulse Width Modulation) control by inverters 60-1 and 60-2 is used, for example. It is noted that, since a well-known common technique may be used as a method for controlling the motor by the PWM control by the inverters, detailed description thereof will not be repeated.

Battery 70 is representatively implemented by a DC secondary battery such as a nickel-metal hydride or lithium ion secondary battery. Charging power and discharging power of battery 70 are controlled so as not to exceed rechargeable power Win and dischargeable power Wout set by EUC 150.

Converter 90 makes voltage conversions between battery 70 and inverter 60. Converter 90 boosts the voltage of battery 70 (more exactly, a DC voltage VL across electric power lines PL0 and GL0 for exchanging electric power between converter 90 and battery 70) for output to inverter 60. Converter 90 controls the output voltage of converter 90 (more exactly, a DC voltage VH across electric power lines PL1 and GL1 for exchanging electric power between converter 90 and inverter 60) based on a control signal S3 from ECU 150. Accordingly, the output of battery 70 will also be controlled based on control signal S3.

Smoothing capacitor C0 is connected across electric power lines PL1 and GL1. Smoothing capacitor C0 stores electric charges depending on voltage VH, thereby smoothing voltage VH.

Hybrid vehicle 100 further includes a brake pedal sensor 125, an accelerator pedal sensor 126, a shift position sensor 127, a vehicular speed sensor 129, and rotation angle sensors 131, 132. These sensors each transmit a detection result to ECU 150.

Brake pedal sensor 125 detects a user's operated amount BRK of a brake pedal (not shown). For example, brake pedal sensor 125 is implemented by a pressure sensor detecting a master cylinder pressure output from a master cylinder (not shown) configured to produce a fluid pressure in accordance with the operated amount of the brake pedal.

Accelerator pedal sensor 126 detects an accelerator opening ACC as a result of a user's operation of an accelerator pedal (not shown). Vehicular speed sensor 129 detects a vehicular speed V of hybrid vehicle 100 based on the rotation speed of driving wheel 80 or driving shaft 85.

Rotation angle sensor 131 detects a rotor rotation angle θ1 of first MG 20. Rotation angle sensor 132 detects a rotor rotation angle θ2 of second MG 30. Rotation angle sensors 131, 132 are each representatively implemented by a resolver. Based on rotor rotation angles θ1 and θ2, the rotation speed (rpm) and rotation angular velocity (rad/s) of first MG 20 and second MG 30 can be calculated. Furthermore, it is also possible to obtain the vehicular speed of hybrid vehicle 100 from the rotation speed of second MG 30 and the gear ratio of reduction gear 50.

Shift position sensor 127 detects a shift position SP selected by a user's operation of a shift lever (not shown). Shift positions that can be selected by the user includes a neutral position (N position), a parking position (P position) selected at the time of parking, a drive position (D position) selected at the time of forward running, and an R position selected at the time of reverse running. When the R position is selected, the shift range is brought into the R range. When the R range is selected, hybrid vehicle 100 is controlled to produce vehicle driving force for reverse running. That is, shift position sensor 127 is configured to sense an operational input for selecting forward running or reverse running.

ECU 150 is configured to include a CPU (Central Processing Unit) and a memory, neither shown, and is configured to execute an arithmetic operation based on values detected by the respective sensors by software processing in accordance with a map and a program stored in the memory. Alternatively, at least a part of ECU may be configured to execute a predetermined numeric arithmetic operation and/or a logic operation by hardware processing performed by a dedicated electronic circuit, for example. ECU 150 generates control signals S1 to S4 mentioned above based on information from the respective sensors, for example, and outputs generated control signals S1 to S4 to the respective devices.

In hybrid vehicle 100, running control for performing running suitable for the vehicular state is executed by ECU 150. For example, at the start of vehicle and at the time of low speed running, hybrid vehicle 100 runs with the output of second MG 30 while engine 10 is stopped. At the time of steady running, hybrid vehicle 100 starts up engine 10 and runs with the outputs of engine 10 and second MG 30. In particular, by operating engine 10 at a highly efficient operating point, fuel efficiency of hybrid vehicle 100 is improved.

ECU 150 also calculates total breaking force required of the entire vehicle based on brake operated amount BRK. Furthermore, ECU 150 generates control signal S1 for controlling torque of second MG 30 and control signal SB for braking mechanism 87 so as to ensure total breaking force by the sum of regenerative braking force obtained by second MG 30 and fluid pressure breaking force obtained by braking mechanism 87.

In electric powered vehicles including hybrid vehicle 100, vehicle driving force in a low vehicular speed range can be output by second MG 30, which eliminates the need to provide a torque converter for torque amplification. In hybrid vehicle 100, torque produced by second MG 30 and engine 10 is therefore transmitted to driving shaft 85 and driving wheel 80 without intervention of a torque converter.

Figure 2:
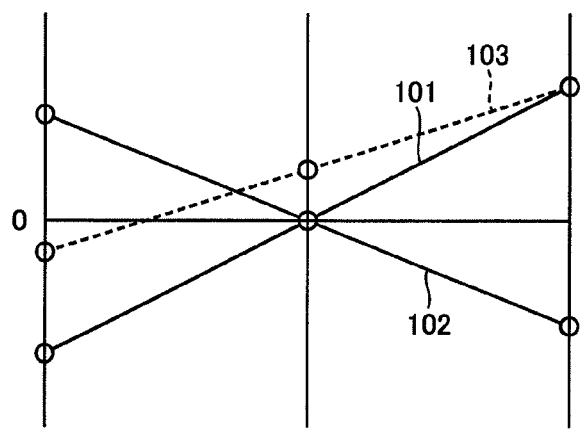
FIG. 2 is a nomographic chart showing the speed relationship between an engine, a first MG and a second MG during running of the hybrid vehicle shown in FIG. 1.

Referring to FIG. 2, at the time of light load represented by vehicle start and low speed running in forward running with the D position selected, hybrid vehicle 100 produces vehicle driving force by rotating second MG 30 in the positive direction while engine 10 is stopped, as indicated by a line 101. Furthermore, when the vehicular speed is low, vehicle driving force, specifically, output torque (positive torque) of second MG 30, is set such that creep torque for creep speed running is produced even when the accelerator pedal is not operated (accelerator off state).

As indicated by a dotted line 103, engine 10 is started when battery 70 is reduced in SOC. When engine 10 is started, first MG 20 generates electric power by means of the output of engine 10, so that charging power of battery 70 is generated.

On the other hand, during reverse running, hybrid vehicle 100 produces vehicle driving force by rotating second MG 30 in the negative direction with engine 10 stopped, as indicated by a line 102. When the R range has been selected, vehicle driving force, specifically, output torque (negative torque) of second MG 30, is set such that creep torque is produced in the reverse running direction if the vehicle is in the accelerator off state when the vehicular speed is low.

In this manner, creep torque is produced by second MG 30. Therefore, since regenerative brake by second MG 30 cannot be produced when the brake pedal is operated during creep running, vehicle breaking force in accordance with brake operated amount BRK is produced by braking mechanism 87. That is, second MG 30 outputs creep torque, while vehicle breaking force is produced by braking mechanism 87. Therefore, from a viewpoint of improving fuel efficiency, correction for reducing creep torque (creep cut) similarly to PTD 1 is preferable.

The first embodiment will describe running control (creep control) for appropriately controlling vehicle driving force (i.e., creep torque) when the vehicular speed is low in the accelerator off state in electric powered vehicles including hybrid vehicle 100.

As a functional block for this creep control, ECU 150 includes a creep control unit 152 for setting creep torque and an MG control unit 154 for controlling second MG 30 so as to output creep torque set by creep control unit 152. The respective functions of creep control unit 152 and MG control unit 154 are implemented by software processing and/or hardware processing by ECU 150. In the first embodiment, creep control unit 152 of ECU 150 operates as "a control unit" for controlling creep torque produced by the powertrain in the accelerator off state.

Figure 3:
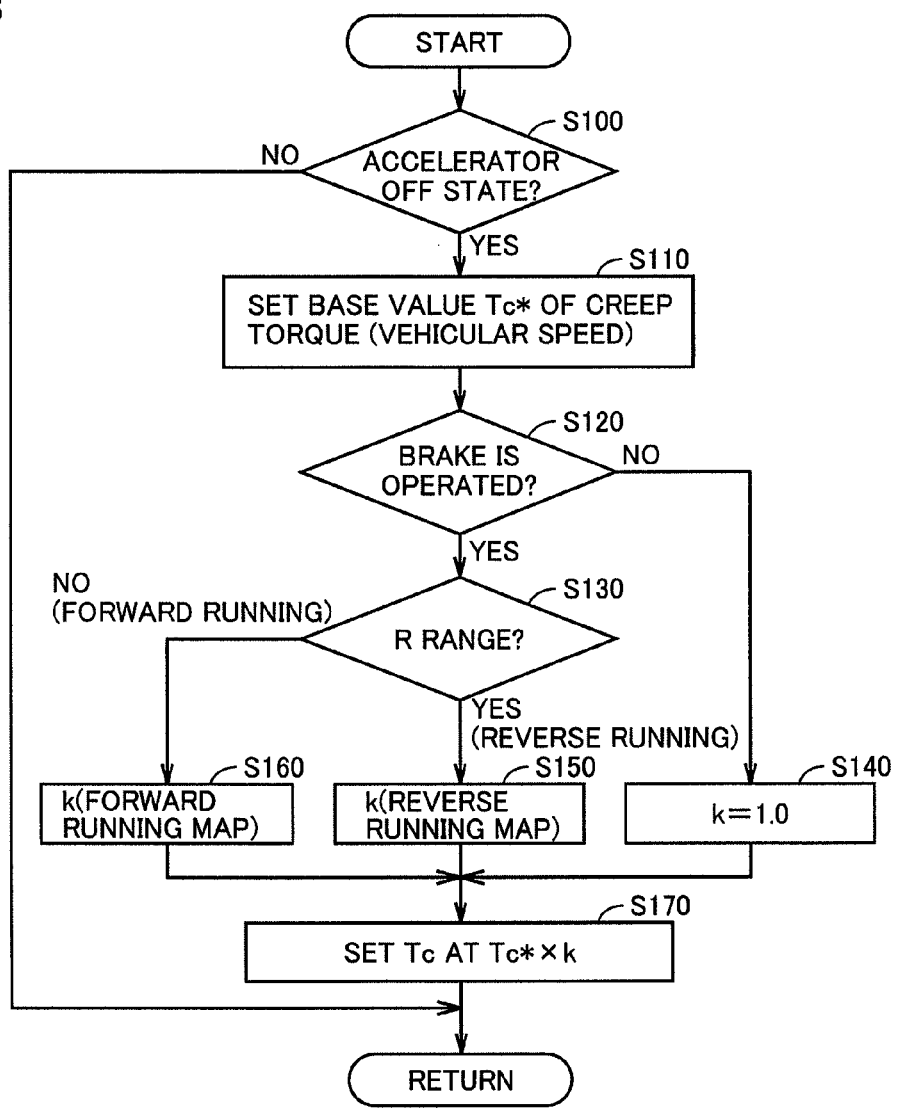
FIG. 3 is a flowchart showing a procedure of creep control by the control device for a vehicle according to the first embodiment of the present invention.

FIG. 3 is a flowchart showing a procedure of creep control by the control device for a vehicle in accordance with the first embodiment of the present invention. The control procedure in accordance with the flowchart shown in FIG. 3 is executed by ECU 150 at certain intervals during creep running.

Referring to FIG. 3, ECU 150 determines in step S100 whether the accelerator is in the off state. The determination in step S100 can be executed based on a detection value of accelerator opening ACC obtained by accelerator pedal sensor 126. It is noted that, since creep running is stopped when the accelerator is operated (NO determination in S100), processing of steps S110 to S170 which will be described below is skipped.

ECU 150 sets in step S110 a base value Tc* of creep torque in the accelerator off state (YES determination in S100). For this base value Tc*, a value corresponding to vehicular speed V is previously set as vehicle driving force requested for creep running when ACC=0 holds, for example. During forward running, Tc* is set at a positive value, and during reverse running, Tc* is set at a negative value.

Furthermore, ECU 150 determines in step S120 whether the brake pedal is operated. The determination in step S120 can be executed based on the detection value of brake operated amount BRK obtained by brake pedal sensor 125 shown in FIG. 1.

ECU 150 advances the processing to step S140 when the brake pedal is not operated (NO determination in S120), and sets creep correction coefficient k so that k=1.0 holds. Then, ECU 150 sets in step S170 a creep torque Tc so that Tc=Tc*×k holds.

A creep correction coefficient k means that creep torque Tc is set in accordance with base value Tc* when k=1.0 holds. Conversely, since creep torque Tc is corrected to fall below base value Tc* by setting k<1.0, creep cut is achieved similarly to PTD 1.

ECU 150 further determines in step S130 whether the R range has been selected when the brake pedal is operated (YES determination in S120). The determination in step S130 can be executed based on the detection value of shift position SP obtained by shift position sensor 127 shown in FIG. 1.

Figure 4:
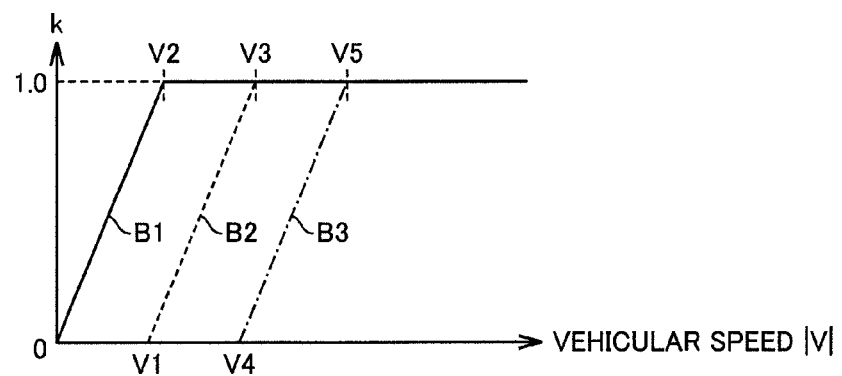
FIG. 4 is a schematic diagram illustrating a setting map of a creep correction coefficient during forward running.
Figure 5:
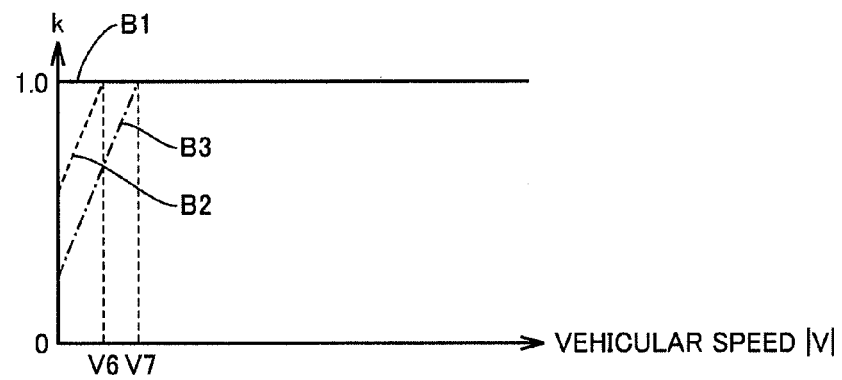
FIG. 5 is a schematic diagram illustrating a setting map of a creep correction coefficient during reverse running.

During selection of the R range (YES determination in S130), ECU 150 advances the processing to step S150, and sets creep correction coefficient k based on a reverse running map shown in FIG. 5. On the other hand, during forward running (NO determination in S130), ECU 150 advances the processing to step S160, and sets creep correction coefficient k based on a forward running map shown in FIG. 4.

As described above, ECU 150 sets in step S170 creep torque Tc in creep running based on the product of creep correction coefficient k set in steps S140 to S160 and base value Tc* set in step S110. Then, MG control unit 154 (FIG. 1) controls output torque of second MG 30 using set creep torque Tc as a torque command value. Accordingly, in the accelerator off state, vehicle driving force in accordance with creep torque Tc set in accordance with the flowchart of FIG. 3 will be produced.

Referring to FIG. 4, creep correction coefficient k during forward running varies in accordance with the brake operated amount and the vehicular speed. FIG. 4 shows, as an example, setting of creep correction coefficient k relative to vehicular speed |V| in each case where brake operated amount BRK=B1 (weak level), BRK=B2 (intermediate level), and BRK=B3 (strong level) hold (B3>B2>B1).

Specifically, when BRK=B1 holds, creep correction coefficient k is set in a range where |V|<V2 holds such that creep torque is decreased as the vehicular speed is lower. On the other hand, in a range where |V|>V2 holds, k is set at 1.0 and creep cut is not executed.

When BRK=B2 holds, creep correction coefficient k is set in a range where |V|<V3 holds (V3>V2) such that creep torque is decreased as the vehicular speed is lower. In a range where |V|<V1 holds, k is set at 0. That is, creep torque Tc=0 holds. On the other hand, in a range where |V|>V3 holds, k is set at 1.0 and creep cut is not executed.

When BRK=B3 holds, in a range where |V|<V5 holds (V5>V3), creep correction coefficient k is set such that creep torque is decreased as the vehicular speed is lower. In a range where |V|<V4 holds (V4>V1), k is set at 0. That is, creep torque Tc=0 holds. On the other hand, in a range where |V|>V5 holds, k is set at 1.0 and creep cut is not executed.

In this manner, during forward running, creep cut is performed by setting k<1.0 when the brake is operated. Particularly when brake operated amount BRK is increased to some degree (in FIG. 4, BRK=B2, B3), creep cut setting Tc at 0 is also executed. It is understood that the range where creep cut is performed is extended as brake operated amount BRK is larger.

FIG. 5 shows a setting map of creep correction coefficient k during reverse running with a brake operated amount equivalent to FIG. 4.

Referring to FIG. 5, creep correction coefficient k also varies during reverse running in accordance with brake operated amount BRK and vehicular speed |V|.

When BRK=B1 holds (weak level), k is set at 1.0 irrespective of the vehicular speed. That is, creep cut is not executed during reverse running when the brake operated amount is small.

When BRK=B2 holds, in a range where |V|<V6 holds, creep correction coefficient k is set such that creep torque is decreased as the vehicular speed is lower. On the other hand, in a range where |V|>V6 holds, k is set at 1.0 and creep cut is not executed. Similarly, when BRK=B3 holds, in a range where |V|<V7 holds, creep correction coefficient k is set such that creep torque is decreased as the vehicular speed is lower. On the other hand, in a range where |V|>V7 holds, k is set at 1.0 and creep cut is not executed.

During reverse running, there is no range provided in which k=0 holds when BRK=B2, B3 holds. As for vehicular speed |V| to be a threshold value of creep cut, V3 in FIG. 4 is higher than V6 in FIG. 5. Similarly, V5 in FIG. 4 is higher than V7 in FIG. 5. In this manner, it is understood that, during reverse running, the range where creep cut is performed is set narrower than in forward running (FIG. 4).

Here, a creep torque amount ΔTc decreased by creep cut (hereinafter also referred to as the creep cut amount) is defined as ΔTc=|Tc*|×(1−k). Here, (1−k) is equivalent to the ratio of creep cut amount to a base value |Tc*|, and will thus be referred to as a "creep cut rate" as well.

By setting creep correction coefficient k as shown in FIGS. 4 and 5, creep cut amount ΔTc or the creep cut rate during reverse running is set smaller than creep cut amount ΔTc or the creep cut rate during forward running with respect to an equivalent brake operated amount. In each vehicular speed range to which creep cut is applied during forward running, the range where creep correction coefficient k (i.e., creep cut amount ΔTc or the creep cut rate) varies in accordance with brake operated amount BRK is smaller in reverse running than in forward running.

Alternatively, as a variation, creep cut is performed during forward running in accordance with FIG. 4, while during reverse running, k may be fixed at 1.0 and creep cut may not be executed (i.e., ΔTc fixed at 0 and the creep cut rate fixed at 0). Then, in the range where creep cut is applied during forward running, creep cut amount ΔTc or the creep cut rate will also be set smaller in reverse running than in forward running. That is, in reverse running, the degree of reduction in creep torque by creep cut can be made smaller than in forward running.

Although the first embodiment describes the example of adjusting the creep cut amount or the creep cut rate by setting creep correction coefficient k, it is also possible to directly set creep cut amount ΔTc or creep torque Tc based on the vehicular speed and the brake operated amount such that setting of creep cut amount ΔTc becomes equivalent without using creep correction coefficient k.

Figure 10:
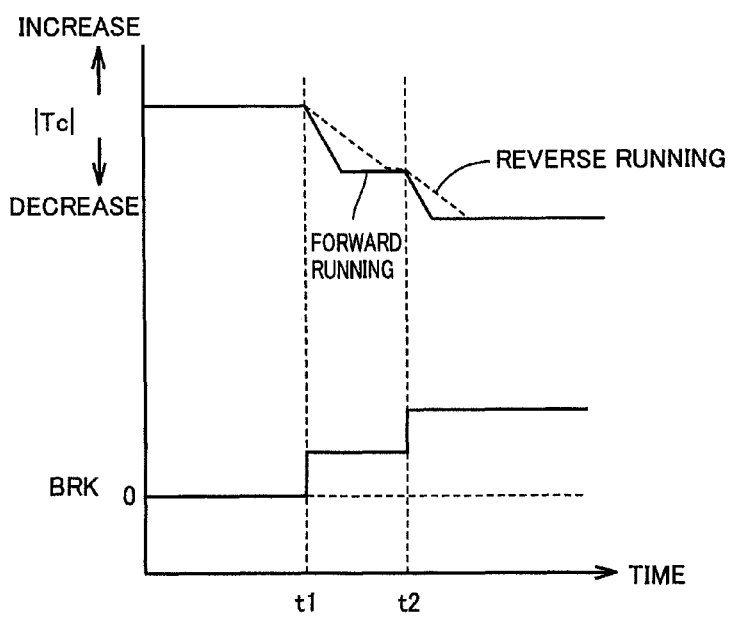
FIG. 10 is a conceptual waveform diagram for illustrating changes in creep cut rate between forward running and reverse running.

Alternatively, as shown in FIG. 10, the rate of changes in creep torque at the time of creep cut (hereinafter also referred to as "a creep cut rate") may be changed between forward running and reverse running.

Referring to FIG. 10, the brake pedal is operated at time t1, and brake operated amount BRK is increased at time t2. In this occasion, creep cut is executed in accordance with the brake operation at time t1, and the absolute value |Tc| of creep torque is decreased at a certain time change rate (creep cut rate). The creep cut rate during reverse running is set lower than the creep cut rate during forward running. Accordingly, the degree of reduction in creep torque by creep cut can be made smaller than in forward running such that the creep torque is not sensitively changed during reverse running in accordance with changes in brake operated amount. It is noted that the creep cut rate can also be varied in accordance with vehicular speed |V| and/or brake operated amount BRK only within a range where the degree of reduction in creep torque during reverse running is smaller than in forward running.

In this manner, by adjusting at least one of the creep cut amount, creep cut rate and creep cut rate, the degree of reduction in creep torque by creep cut accompanied by a brake operation can be made smaller in reverse running than in forward running.

Accordingly, in the control device for a vehicle according to the first embodiment of the present invention, in creep running accompanied by a brake operation, the degree of changes in creep torque corresponding to changes in brake operated amount BRK is smaller in reverse running than in forward running.

Therefore, creep torque during reverse running often used in the case of parking can be restrained from varying sensitively in accordance with changes in brake operated amount BRK. As a result, the user can be prevented from suffering from an uncomfortable feeling due to sensitive variations in vehicle driving force (creep torque) also in the situation where the user operates the brake pedal delicately, for example, for parking the vehicle into the garage by reverse running.

On the other hand, during forward running in creep running, by increasing the degree of reduction in creep torque by creep cut relative to an equivalent brake operated amount (representatively, creep cut amount ΔTc), priority can be given to improvement in fuel efficiency achieved by creep cut over delicate handling of the brake pedal as in reverse running.

It is noted that the setting of creep torque described in the first embodiment can be generally applied to electric powered vehicles including not only the hybrid vehicle shown in FIG. 1 but also a hybrid vehicle having a different structure of a powertrain from FIG. 1, an electric vehicle using only an electric motor as the source of vehicle driving force, a fuel cell vehicle, and the like. Creep control similar to the first embodiment can be applied to a vehicle having a structure in which vehicle driving force (i.e., output torque from the powertrain) can be controlled directly even if it is not an electric powered vehicle.

Second Embodiment

In the first embodiment, vehicle driving force (creep torque) in creep running is controlled by directly designating a creep torque value. The second embodiment will describe creep control in a vehicle in which the value of vehicle driving force (creep torque) cannot be set directly, for example, a vehicle equipped with an engine in which output torque itself cannot be controlled to attain a command value as the source of vehicle driving force (hereinafter also referred to as a "conventional engine vehicle").

Figure 6:
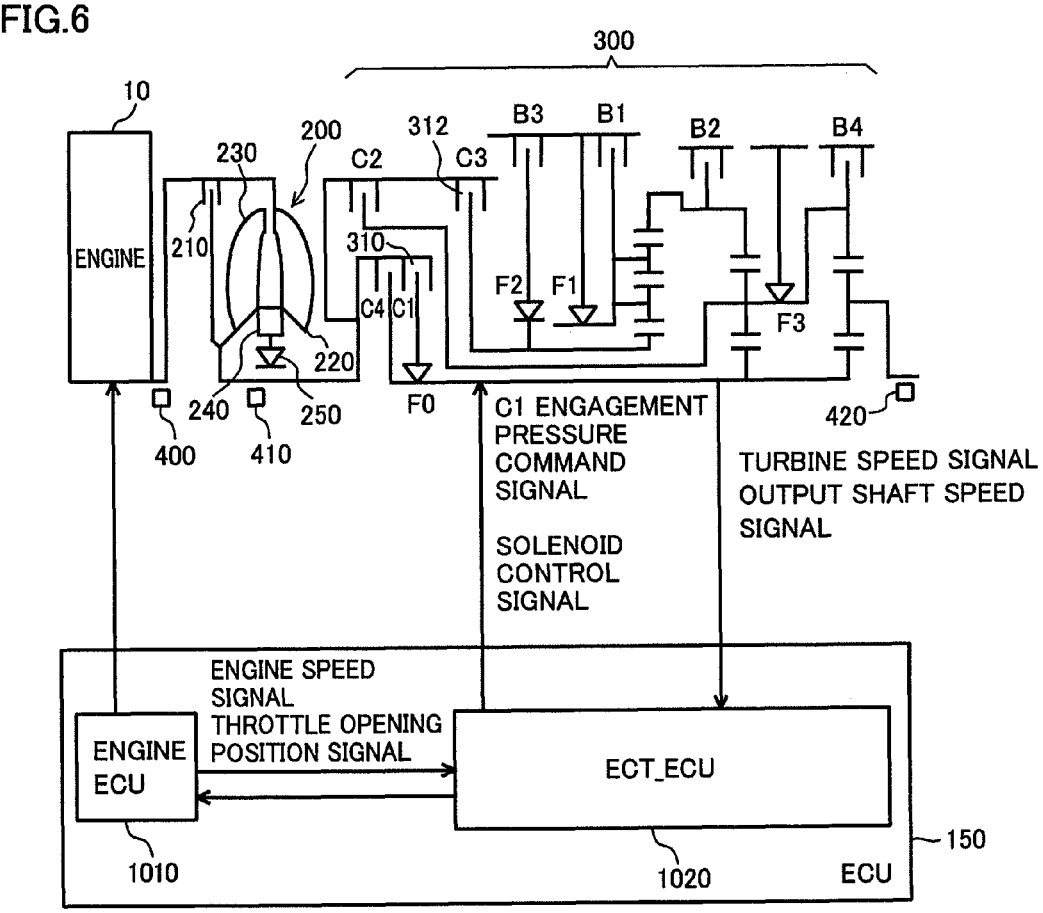
FIG. 6 is a schematic diagram illustrating an exemplary configuration of a powertrain of a vehicle to which a control device for a vehicle according to a second embodiment of the present invention is applied.

FIG. 6 is a schematic diagram illustrating an exemplary configuration of a powertrain of a vehicle (conventional engine vehicle) to which a control device for a vehicle in accordance with a second embodiment of the present invention is applied.

Referring to FIG. 6, the powertrain of this vehicle includes engine 10, a torque converter 200, an automatic transmission 300, and ECU 150.

The output shaft of engine 10 is connected to the input shaft of torque converter 200. Engine 10 and torque converter 200 are coupled with a rotation shaft. Therefore, the output shaft speed (engine speed) of engine 10 sensed by an engine speed sensor 400 and the input shaft speed (pump speed) of torque converter 200 are identical.

Torque converter 200 includes a lock-up clutch 210 bringing the input shaft and the output shaft into a directly coupled state, a pump impeller 220 on the input shaft side, a turbine wheel 230 on the output shaft side, and a stator 240 exerting a torque amplifying function. Stator 240 is provided with a one-way clutch 250.

Torque converter 200 and automatic transmission 300 are connected with a rotation shaft. The output shaft speed (turbine speed) of torque converter 200 is sensed by a turbine speed sensor 410. The output shaft speed of automatic transmission 300 is sensed by an output shaft speed sensor 420.

Automatic transmission 300 includes clutch elements C1 to C4 as friction elements, brake elements B1 to B4, and one-way clutch elements F0 to F3. By combining engagement and release of these clutch elements C1 to C4, brake elements B1 to B4 and one-way clutch elements F0 to F3, one of a plurality of gear stages set previously is formed selectively.

For example, at the time of first gear used when starting the vehicle, clutch element C1 and one-way clutch elements F0, F3 are engaged. Of these clutch elements, clutch element C1 is particularly called an input clutch 310 as well. This input clutch (C1) 310 is also called a forward running clutch or a forward clutch, and is always used in the engaged state when constituting a gear range for the vehicle to move forward other than the P position, R position and neutral (N) position.

ECU 150 includes an engine ECU 1010 controlling engine 10 and an ECT (Electronic Controlled Automatic Transmission)_ECU 1020 controlling automatic transmission 300.

Engine ECU 1010 controls the fuel injection quantity, ignition timing, intake air volume, and the like of engine 10 in accordance with accelerator opening ACC and the vehicular speed.

ECT_ECU 1020 receives a signal indicative of the turbine speed from turbine speed sensor 410 and a signal indicative of the output shaft speed from output shaft speed sensor 420. ECT_ECU 1020 also receives a signal indicative of the engine speed sensed by engine speed sensor 400 and a signal indicative of the throttle opening angle sensed by a throttle position sensor (not shown) from engine ECU 1010.

ECT_ECU 1020 selects a gear stage corresponding to the vehicular speed and the engine state (representatively, the engine speed) in accordance with a speed change diagram set previously. Then, engagement/release of clutch elements C1 to C4, brake elements B1 to B4 and one-way clutch elements F0 to F3 is controlled such that the selected gear stage is formed.

In the vehicle shown in FIG. 6, engine 10 is in the idle state when the accelerator pedal is not operated (accelerator off state). That is, the output of engine 10 in the idle state is transmitted to a driving wheel via torque converter 200 and automatic transmission 300, so that creep torque is produced.

In the idle state, engine 10 is controlled by engine ECU 1010 such that the engine speed matches an idle target speed. Therefore, the creep torque in the accelerator off state has a magnitude depending on the engine speed in the idle state, that is, the idle target speed. That is, in the second embodiment, engine ECU 1010 in ECU 150 operates as a "control unit" for controlling creep torque produced by the powertrain in the accelerator off state.

Figure 7:
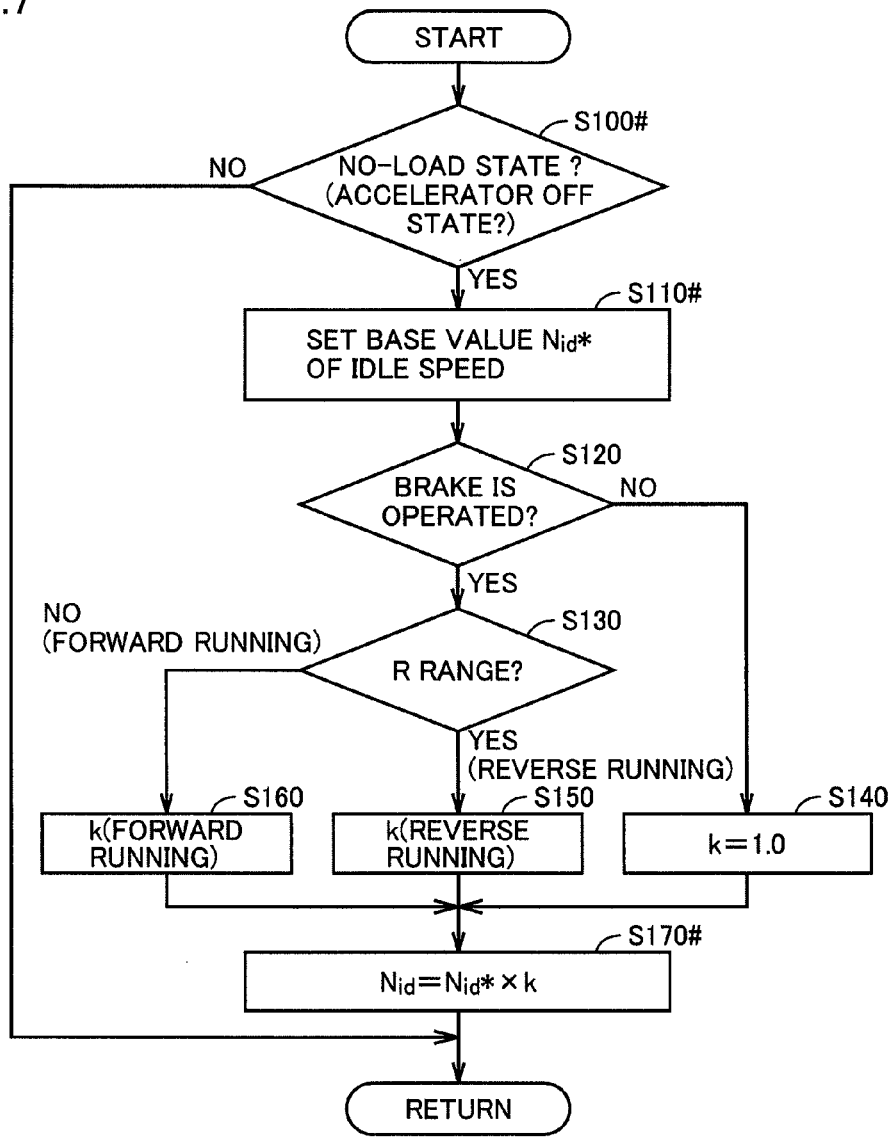
FIG. 7 is a flowchart for illustrating idle speed control of an engine for creep control by the control device for a vehicle according to the second embodiment of the present invention.

FIG. 7 is a flowchart for illustrating idle speed control of the engine for creep control by the control device for a vehicle in accordance with the second embodiment of the present invention. The control procedure in accordance with the flowchart shown in FIG. 7 is executed by engine ECU 1010 at certain intervals.

Referring to FIG. 7, ECU 150 (engine ECU 1010) determines in step S100# whether engine 10 is in a no-load state. For example, it is determined in step S100# whether the accelerator off state has been brought about.

When engine 10 is not in the no-load state (NO determination in S100#), that is, when the accelerator is on, engine 10 is not in the idle state. Then, processing of steps S110# to S170# for setting the idle target speed is skipped.

Engine ECU 1010 sets in step S110# a base value Nid* of the idle target speed when engine 10 is in the no-load state (YES determination in S100#). For example, a map for determining base value Nid* of the idle target speed in accordance with the engine water temperature, the vehicular speed and the like is set previously.

Furthermore, engine ECU 1010 sets in step S140 creep correction coefficient k at 1.0 when the brake is not operated, by S120 to S160 similar to FIG. 3. On the other hand, when the brake is operated, creep correction coefficient k is set individually in forward running and reverse running in steps S150 and S160.

Then, engine ECU 1010 calculates in step S170# an idle target speed Nid based on the product of creep correction coefficient k set in step S140 to 160 and base value Nid* of the idle target speed set in step S110#. Engine ECU 1010 controls the fuel injection quantity, ignition timing, intake air volume, and the like of engine 10 such that the engine speed attains idle target speed Nid.

In the vehicle control device according to the second embodiment, by setting idle target speed Nid, creep cut can be achieved when the brake is operated. That is, the idle target speed is made lower by setting k<1.0, so that improvement in fuel efficiency by creep cut can be achieved.

For example, creep correction coefficient k can be set in accordance with brake operated amount BRK and vehicular speed |V| similarly to FIGS. 4 and 5. However, in the second embodiment, the decrease in idle target speed for creep cut needs to be limited to fall within a range where engine stall does not occur.

In the second embodiment, creep torque amount $\Delta Tc$ reduced by creep cut will have a magnitude corresponding to a difference (decrement) $\Delta Nid$ ($\Delta Nid = Nid^* \times (1-k)$) of the idle target speed when the brake is operated from the idle target speed when the brake is not operated. That is, (1−k) is also equivalent to the creep cut rate in the second embodiment.

In this manner, in the second embodiment as well, creep correction coefficient k is set such that $\Delta Nid$ (creep cut amount $\Delta Tc$ or the creep cut rate) is increased as the brake operated amount is increased. Similarly to the first embodiment, $\Delta Nid$ (creep cut amount $\Delta Tc$ or the creep cut rate) during reverse running is set smaller than $\Delta Nid$ (creep cut amount $\Delta Tc$ or the creep cut rate) during forward running with respect to an equivalent brake operated amount. In each vehicular speed range where creep cut is applied during forward running, the range where creep correction coefficient k (i.e., creep cut amount $\Delta Tc$ or the creep cut rate) varies in accordance with brake operated amount BRK is smaller in reverse running than in forward running.

Alternatively, during forward running, a range where k<1.0 holds in accordance with the brake operated amount is established, and it is also possible to fix k at 1.0 during reverse running. Then, creep control can also be performed such that ΔNid during reverse running (i.e., creep cut amount ΔTc or the creep cut rate) becomes smaller than ΔNid during forward running.

Therefore, also in the vehicle control device according to the second embodiment, in creep running accompanied by a brake operation, the degree of reduction in creep torque by creep cut can be made smaller in reverse running than in forward running. As a result, in creep running during reverse running often used in the case of parking, the degree of changes in creep torque corresponding to changes in brake operated amount BRK becomes small as compared with creep running during forward running.

Accordingly, during reverse running, creep torque can be controlled such that creep torque is restrained from sensitively varying in correspondence to changes in brake operated amount, similarly to the first embodiment. As a result, the user can be prevented from suffering from an uncomfortable feeling due to sensitive variations in vehicle driving force (creep torque) during reverse running, while priority is given to improvement in fuel efficiency by creep cut during forward running.

Variation of Second Embodiment

Referring again to FIG. 6, for the powertrain of a conventional engine vehicle, so-called "neutral control" for achieving improvement in fuel efficiency by automatically controlling automatic transmission 300 to attain a state close to neutral when a predetermined condition is met is known. For example, in the accelerator off state and when the vehicular speed is low when the brake pedal is operated, neutral control is executed by releasing input clutch (C1) 310 to attain a predetermined slip state with the forward running position maintained.

When neutral control is executed, a state close to neutral can be formed in which torque from engine 10 is not transferred to automatic transmission 300. Accordingly, the load of engine 10 is lowered, so that the fuel efficiency when engine 10 maintains idle target speed Nid is improved. That is, it is understood that when neutral control is executed, vehicle driving force (i.e., creep torque) output to a driving wheel also becomes lower than when neutral control is not executed. Therefore, in the variation of the second embodiment, neutral control is applied to perform creep cut for reducing creep torque when the brake is operated. That is, in the variation of the second embodiment, ECT_ECU 1020 in ECU 150 operates as a "control unit" for controlling creep torque produced by the powertrain in the accelerator off state.

Figure 8:
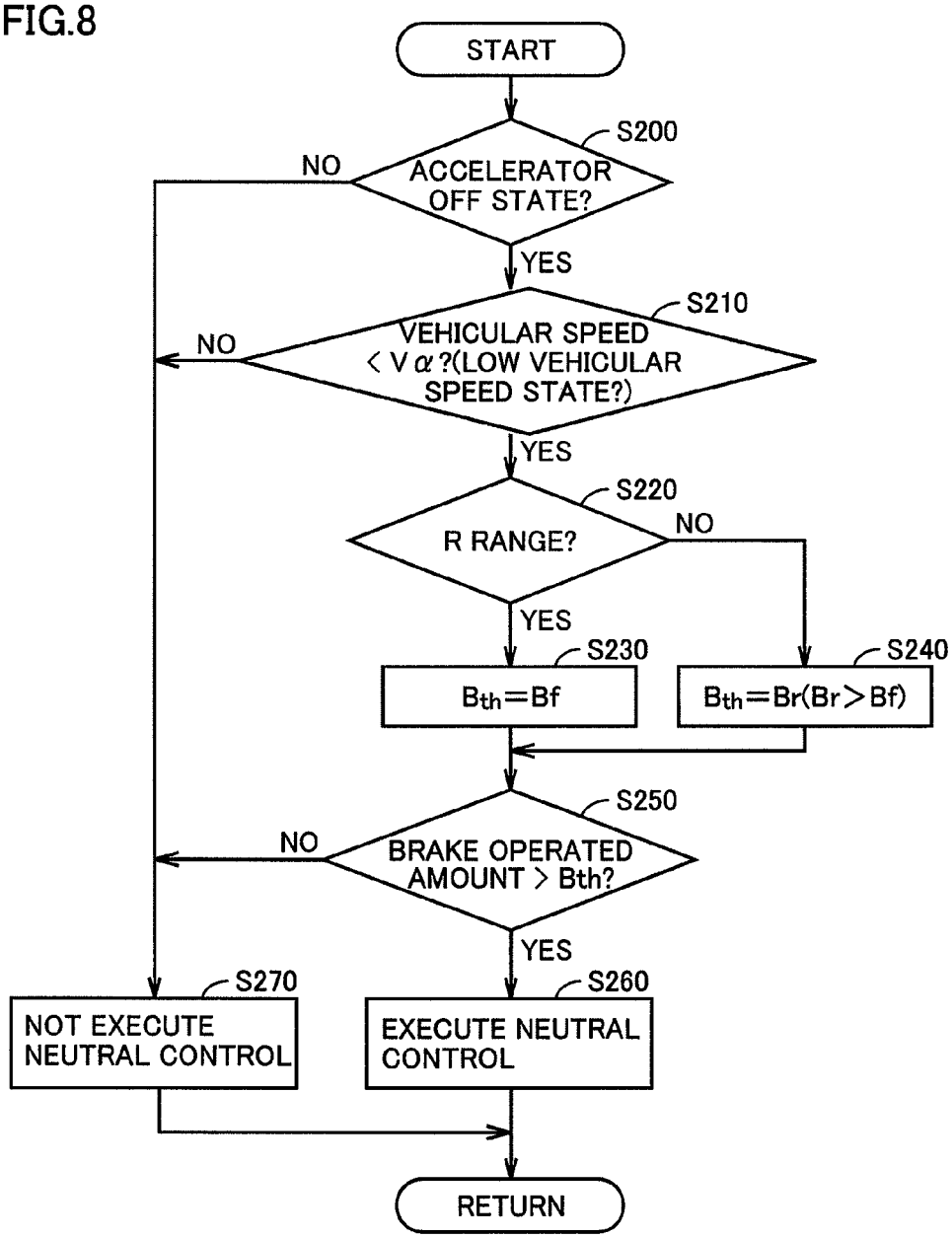
FIG. 8 is a flowchart illustrating necessity determination processing in neutral control for creep control by a control device for a vehicle according to a variation of the second embodiment of the present invention.

FIG. 8 is a flowchart illustrating necessity determination processing in neutral control for creep control by a control device for a vehicle according to a variation of the second embodiment of the present invention. The control procedure in accordance with the flowchart shown in FIG. 8 is executed by ECT_ECU 1020 at certain intervals.

Referring to FIG. 8, ECU 150 (ECT_ECU 1020) determines in step S200 whether the accelerator is in the off state. Furthermore, in the accelerator off state (YES determination in S200), ECT_ECU 1020 determines in step S210 whether vehicular speed |V| is lower than a predetermined speed Vα.

In the accelerator on state (NO determination in S200) or when the vehicular speed is not low (NO determination in S210), ECT_ECU 1020 advances the processing to step S270, and does not execute neutral control.

On the other hand, in the accelerator off state (YES determination in S200) and when the vehicular speed is low (YES determination in S210), execution/non-execution of neutral control is determined in accordance with the brake operated amount by processing of following steps S220 to S250.

ECT_ECU 1020 further determines in step S220 whether the R range has been selected. The determination in step S220 can be executed similarly to step S130.

During selection of the R range (YES determination in S220), ECT_ECU 1020 sets in step S230 a threshold value Bth of the brake operated amount at Bf. On the other hand, when the R range is not selected, that is, during forward running (NO determination in S220), ECT_ECU 1020 advances the processing to step S240, and sets threshold value Bth at Br. It is noted that Br>Bf holds.

Furthermore, ECT_ECU 1020 compares in step S250 threshold value Bth set in steps S230 and S240 with brake operated amount BRK.

When brake operated amount BRK is larger than threshold value Bth (YES determination in S250), ECT_ECU 1020 advances the processing to step S260, and executes neutral control. Accordingly, in automatic transmission 300, input clutch (C1) 310 is released to attain a predetermined slip state. As a result, vehicle driving force (creep torque) produced from the powertrain is decreased.

Accordingly, an effect equivalent to creep cut appears. That is, when neutral control is executed, decrement ΔTc of creep torque occurs (ΔTc>0). On the other hand, when neutral control is not executed, ΔTc=0 holds.

On the other hand, when the brake operated amount is smaller than threshold value Bth (NO determination in S250), ECU 150 advances the processing to step S270, and does not execute neutral control. At this time, vehicle driving force (creep torque) produced from the powertrain is larger than when neutral control is executed.

Figure 9:
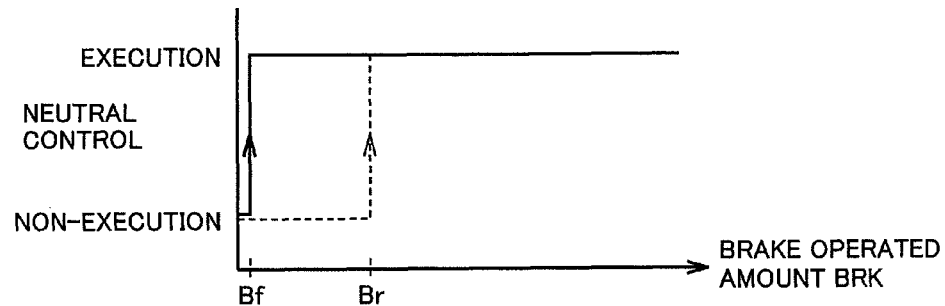
FIG. 9 is a conceptual diagram illustrating the relationship between the brake operated amount and execution/non-execution of neutral control in creep control by the control device for a vehicle according to the variation of the second embodiment of the present invention.

Referring to FIG. 9, threshold value Br during reverse running in neutral control is set at a value larger than threshold value Bf during forward running. During forward running by creep running, by setting threshold value Bf at a relatively small value, neutral control can be executed in response to an operation of the brake pedal. Accordingly, improvement in fuel efficiency can be achieved similarly to creep cut.

However, during reverse running by creep running, brake operated amount BRK may vary crossing threshold value Bf because of a delicate brake pedal operation for parking. In this case, neutral control is switched between execution and non-execution, so that vehicle driving force (creep torque) will vary frequently. Accordingly, it is of concern that the user suffers from an uncomfortable feeling.

Therefore, during reverse running, threshold value Br of the brake operated amount for neutral control is set in correspondence to a relatively large value, for example, the amount of operation when the user operates the brake pedal for reliably stopping the vehicle. Accordingly, creep torque during reverse running can be restrained from varying greatly in accordance with changes in brake operated amount. That is, in creep running accompanied by a brake operation, the degree of reduction in creep torque by creep cut (creep cut amount ΔTc) can be made smaller in reverse running than in forward running.

Therefore, also in the control device for a vehicle according to the variation of the second embodiment, in creep running during reverse running often used in the case of parking, creep torque can be controlled such that changes in creep torque relative to changes in brake operated amount BRK is smaller than in creep running. That is, similarly to the first embodiment, during reverse running, the degree of changes in creep torque in correspondence to changes in brake operated amount BRK is smaller than in forward running.

As a result, the user can be prevented from suffering from an uncomfortable feeling due to sensitive changes in vehicle driving force (creep torque) during reverse running, while priority is given to improvement in fuel efficiency by creep cut during forward running.

It should be understood that the embodiments disclosed herein are illustrative and non-restrictive in every respect. The scope of the present invention is defined by the claims not by the description above, and is intended to include any modification within the meaning and scope equivalent to the terms of the claims.

INDUSTRIAL APPLICABILITY

The present invention is applicable to control of a vehicle configured to output vehicle driving force (creep torque) in the accelerator off state.

REFERENCE SIGNS LIST 10 engine; 20 first MG; 30 second MG; 40 power split device; 50 reduction gears; 60, 60-1, 60-2 inverter; 70 battery; 80 driving wheel; 85 driving shaft; 87 braking mechanism; 90 converter, 100 hybrid vehicle; 101, 102, 103 line; 125 brake pedal sensor; 126 accelerator pedal sensor; 127 shift position sensor; 129 vehicle speed sensor; 131, 132 rotational angle sensor; 152 creep control unit; 154 MG control unit; 200 torque converter; 210 lock-up clutch; 220 pump impeller; 230 turbine wheel; 240 stator; 250 one-way clutch; 300 automatic transmission; 310 input clutch (C1); 400 engine speed sensor; 410 turbine speed sensor; 420 output shaft speed sensor; B1-B4 brake element; BRK brake operated amount; Bf, Br, Bth threshold value (brake operated amount); C0 smoothing capacitor; C1 to C4 clutch element; F0-F3 one-way clutch element; Nid idle target speed; Nid* base value (idle target speed); PL0 PL1 electric power line; S1-S4 control signal; SP shift position; Tc creep torque; Tc* base value (creep torque); V vehicular speed; VH DC voltage; k creep correction coefficient.

The invention claimed is:

1. A control device for a vehicle on which a powertrain for producing vehicle driving force for a wheel and a braking mechanism for producing vehicle breaking force in accordance with an operation of a brake pedal are mounted, comprising:
 a shift position sensor configured to sense an input for selecting between a range for forward running and a range for reverse running; and
 an electronic control unit configured to control creep torque (Tc) produced by said powertrain when an accelerator pedal is not operated,
 said electronic control unit controlling said creep torque such that when said brake pedal is operated, a degree of reduction in said creep torque when said range for reverse running is selected is smaller than said degree of reduction in said creep torque when said range for forward running is selected;
 wherein forward running is defined as when the range for forward running is selected and when the vehicle travels in a forward direction; and
 wherein reverse running is defined as when the range for reverse running is selected and when the vehicle travels in a reverse direction.

2. The control device for a vehicle according to claim 1, wherein said powertrain includes an electric motor configured to have a motive power transmission path leading to said wheel,
 said control device further comprising an electric motor control unit configured to control output torque of said electric motor so as to produce said creep torque set by said electronic control unit.

3. The control device for a vehicle according to claim 2, wherein said electronic control unit sets said degree of reduction when said brake pedal is operated based on an operated amount of said brake pedal and a vehicular speed.

4. The control device for a vehicle according to claim 1, wherein as an absolute value of the vehicle speed becomes higher, said electronic control unit decreases the degree of reduction in said creep torque, and
 when said range for reverse running is selected and the vehicle is travelling in a reverse direction, the absolute value of vehicle speed at which the degree of reduction in said creep torque is decreased is lower than that of absolute value of vehicle speed when said range for forward running is selected and the vehicle travels in a forward direction.

5. The control device for a vehicle according to claim 1, wherein
 said powertrain has an internal combustion engine and a torque converter, and
 said electronic control unit controls an idle speed of said internal combustion engine, thereby varying said creep torque.

6. The control device for a vehicle according to claim 5, wherein
 said electronic control unit, as for the degree of reduction in said idle speed when said brake pedal is operated, controls said idle speed such that the degree of reduction when said range for reverse running is selected is smaller than the degree of said reduction when said range for forward running is selected, the degree of reduction in creep torque in either case being smaller relative to said idle speed than when said brake pedal is not operated.

7. The control device for a vehicle according to claim 1, wherein
 said powertrain has an internal combustion engine, a torque converter and a transmission,
 when an operated amount of said brake pedal is larger than a threshold value when said accelerator pedal is not operated and when a vehicular speed is lower than a predetermined speed, said electronic control unit is configured to execute control of releasing a predetermined friction element of a plurality of friction elements included in said torque converter, thereby reducing torque input from said internal combustion engine to said transmission, and
 when said range for reverse running is selected, said threshold value is set at a value larger than when said forward running is selected.

8. A control method implemented by an electronic control unit (ECU) of a vehicle on which a powertrain for producing vehicle driving force for a wheel and a braking mechanism for producing vehicle breaking force in accordance with an operation of a brake pedal are mounted, the control method comprising a step of controlling creep torque produced by said powertrain when an accelerator pedal is not operated,
 said step of controlling including:
 determining which of the range for forward running and the range for reverse running has been selected, and controlling said creep torque such that when said brake pedal is operated, a degree of reduction in said creep torque when said range for reverse running is selected is smaller than said degree of reduction in said creep torque when said range for forward running is selected;

wherein the ECU is implemented via a hardware processor.

* * * * *